(12) United States Patent
Nakazato

(10) Patent No.: US 11,097,767 B2
(45) Date of Patent: Aug. 24, 2021

(54) STEERING SYSTEM

(71) Applicant: NSK Ltd., Tokyo (JP)

(72) Inventor: Youhei Nakazato, Gunma (JP)

(73) Assignee: NSK LTD., Tokyo (JP)

( * ) Notice: Subject to any disclaimer, the term of this patent is extended or adjusted under 35 U.S.C. 154(b) by 103 days.

(21) Appl. No.: 16/606,267

(22) PCT Filed: Apr. 21, 2017

(86) PCT No.: PCT/JP2017/015997
§ 371 (c)(1),
(2) Date: Oct. 18, 2019

(87) PCT Pub. No.: WO2018/193610
PCT Pub. Date: Oct. 25, 2018

(65) Prior Publication Data
US 2021/0129893 A1 May 6, 2021

(51) Int. Cl.
*B62D 1/187* (2006.01)

(52) U.S. Cl.
CPC ................. *B62D 1/187* (2013.01)

(58) Field of Classification Search
CPC ......... B62D 1/184; B62D 1/187; B62D 1/189
See application file for complete search history.

(56) References Cited

U.S. PATENT DOCUMENTS

| | | | | |
|---|---|---|---|---|
| 5,871,233 A * | 2/1999 | Tanaka | ................... | B62D 1/197 280/777 |
| 6,981,430 B2 * | 1/2006 | Murakami | ............. | B62D 1/184 280/775 |
| 8,353,533 B2 * | 1/2013 | Aota | ...................... | B62D 1/189 280/779 |
| 8,528,937 B2 * | 9/2013 | Minamigata | .......... | B62D 1/195 280/777 |
| 8,770,623 B1 | 7/2014 | Palmer et al. | | |
| 9,446,783 B2 | 9/2016 | Yamamoto | | |

(Continued)

FOREIGN PATENT DOCUMENTS

| | | |
|---|---|---|
| CN | 102112361 A | 6/2011 |
| CN | 106064638 A | 11/2016 |

(Continued)

OTHER PUBLICATIONS

Japanese Notification of Reasons for Refusal issued in JP 2019-513189 dated Jul. 30, 2019.

(Continued)

*Primary Examiner* — Nicole T Verley

(74) *Attorney, Agent, or Firm* — Sughrue Mion, PLLC

(57) ABSTRACT

A steering system includes a steering column, a column bracket, a distance bracket, a rod, and an elastic member. The steering column supports an input shaft coupled to the steering wheel. The column bracket has a long hole therethrough and supports the steering column. The distance bracket includes: two vertical plates provided on an outer circumferential surface of the steering column and extending along the column bracket; and a horizontal plate coupling together the two vertical plates. The rod penetrates the long hole and the vertical plates. The elastic member is positioned between the horizontal plate and the rod and presses the rod toward the steering column.

5 Claims, 8 Drawing Sheets

(56) References Cited

U.S. PATENT DOCUMENTS

| | | | |
|---|---|---|---|
| 9,802,637 B2 * | 10/2017 | Takahashi | B62D 1/189 |
| 10,377,408 B2 * | 8/2019 | Strong | B62D 1/192 |
| 2011/0163524 A1 | 7/2011 | Aota et al. | |
| 2011/0175335 A1 * | 7/2011 | Takezawa | B62D 1/185 |
| | | | 280/775 |
| 2011/0203403 A1 * | 8/2011 | Maniwa | B62D 1/189 |
| | | | 74/493 |
| 2013/0042716 A1 * | 2/2013 | Davies | B62D 1/184 |
| | | | 74/493 |
| 2016/0311460 A1 | 10/2016 | Imagaki et al. | |

FOREIGN PATENT DOCUMENTS

| | | |
|---|---|---|
| JP | 2000-16303 A | 1/2000 |
| JP | 2010-083227 A | 4/2010 |
| JP | 2010-179801 A | 8/2010 |
| JP | 2012-250615 A | 12/2012 |
| WO | 2015/114991 A1 | 8/2015 |

OTHER PUBLICATIONS

International Search Report of PCT/JP2017/015997 dated Jul. 4, 2017.
Communication dated Apr. 14, 2020, issued by the European Patent Office in application No. 17906053.8.

* cited by examiner

STEERING SYSTEM

CROSS REFERENCE TO RELATED APPLICATIONS

This application is a National Stage of International Application No. PCT/JP2017/015997 filed Apr. 21, 2017.

FIELD

The present invention relates to a steering system.

BACKGROUND

A vehicle includes a steering system that imparts a steering angle to a wheel when a steering wheel is turned around. There has been known a steering system capable of adjusting the position of a steering wheel. For example, Patent Literature 1 discloses a steering system that loosens a tightened column bracket by having an operation lever rotated and thus enables adjustment of the position. The steering system disclosed in Patent Literature 1 includes a biasing member that is attached to an inner column and exposed through a slit in an outer column. The biasing member presses a rod radially outward.

CITATION LIST

Patent Literature

Patent Literature 1: WO 2015/114991 A

SUMMARY

Technical Problem

When the tightened column bracket is loosened, a load that has been applied to the rod is reduced or removed. Consequently, rattling may occur when the steering wheel is moved. The biasing member disclosed in Patent Literature 1 is provided to suppress such rattling. However, attachment of the biasing member is difficult without a slit provided in the outer column.

The present invention has been made in view of the above inconvenience and is directed to providing a steering system capable of suppressing rattling that occurs when the position of steering wheel is adjusted and also capable of facilitating attachment of a member for suppressing such rattling.

Solution to Problem

To achieve the above object, a steering system as one aspect of the present invention includes a steering column supporting an input shaft coupled to a steering wheel, a column bracket having a long hole therethrough and supporting the steering column, a distance bracket including two vertical plates and a horizontal plate, the two vertical plates being provided on an outer circumferential surface of the steering column and extending along the column bracket, the horizontal plate coupling together the two vertical plates, a rod penetrating the long hole and the vertical plates, and an elastic member positioned between the horizontal plate and the rod, placed in contact with the horizontal plate and pressing the rod toward the steering column.

Thus, the rod is pressed against an inner wall of the hole provided through the vertical plate. Consequently, rattling that occurs when the steering column moves is suppressed. Furthermore, the elastic member can be attached to the rod even without a slit provided in the steering column. The steering system as one aspect of the present invention is therefore capable of suppressing rattling that occurs when the position of steering wheel is adjusted and also capable of facilitating attachment of a member for suppressing such rattling.

In one desirable aspect for the steering system, the elastic member includes a recessed portion salient toward the horizontal plate, and the rod is fitted in the recessed portion. Thus, the elastic member is prevented from falling off the rod.

In one desirable aspect for the steering system, the elastic member includes a recessed portion salient toward the horizontal plate, and the rod is fitted in the recessed portion. Thus, positioning when the elastic member is attached to the rod is facilitated.

In one desirable aspect for the steering system, the elastic member is a plate spring. Thus, manufacturing of the elastic member is facilitated.

In one desirable aspect for the steering system, a distance from the elastic member to one of the vertical plates is equal to a distance from the elastic member to the other vertical plate. Thus, both of the vertical plates are less likely to have gaps with the rod. Consequently, suppression of rattling that occurs when the position of the steering wheel is adjusted is further facilitated.

Advantageous Effects of Invention

The present invention allows for a steering system capable of suppressing rattling that occurs when the position of steering wheel is adjusted and also capable of facilitating attachment of a member for suppressing such rattling.

DESCRIPTION OF EMBODIMENTS

The following describes the present invention in detail with reference to the drawings. The following mode (hereinafter referred to as embodiment) for carrying out the invention is not intended to limit the present invention. Constituent elements in the following embodiment include those easily conceivable by the skilled person, those substantially identical to each other, and those that fall within what is called the range of equivalents. Any of the constituent elements disclosed in the following embodiment can be combined as appropriate.

Embodiment

Figure 1:
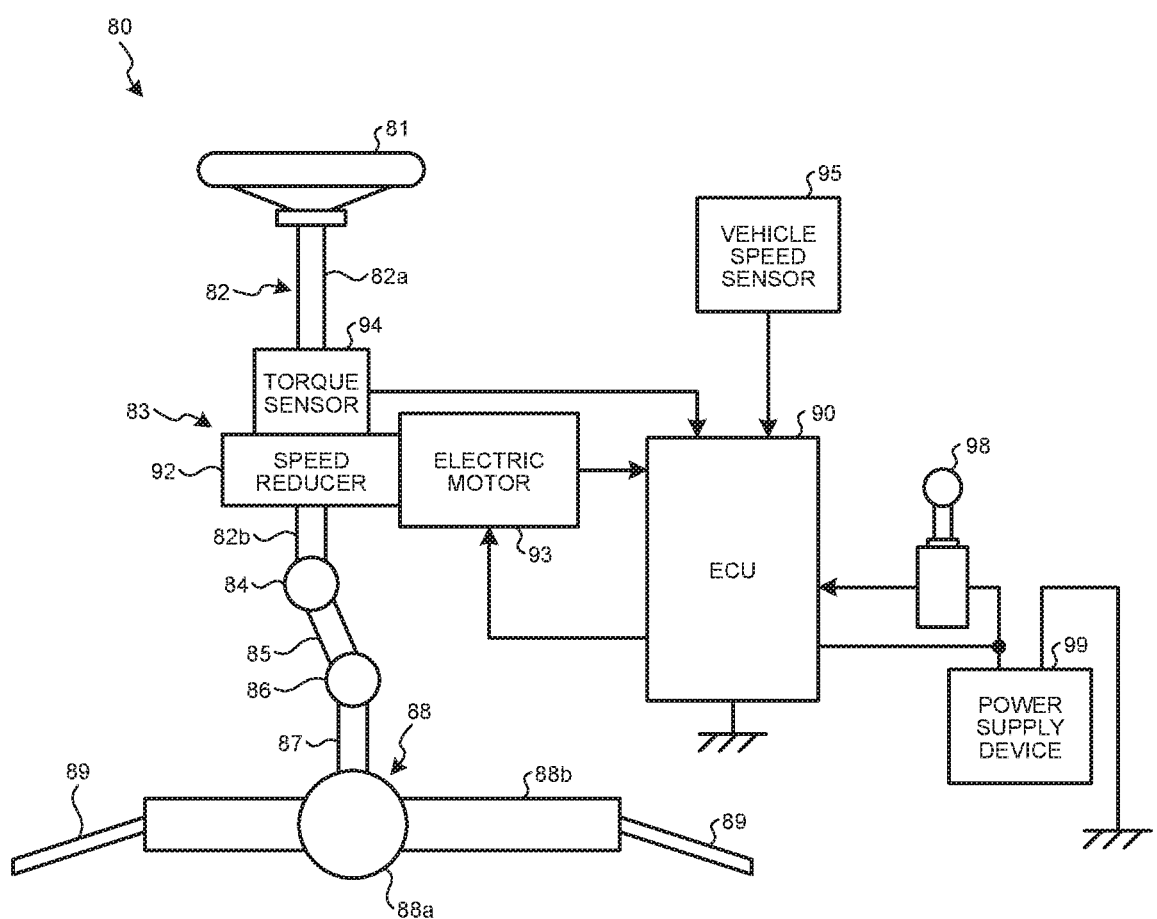
FIG. 1 is a schematic view of a steering system in the present embodiment.
Figure 2:
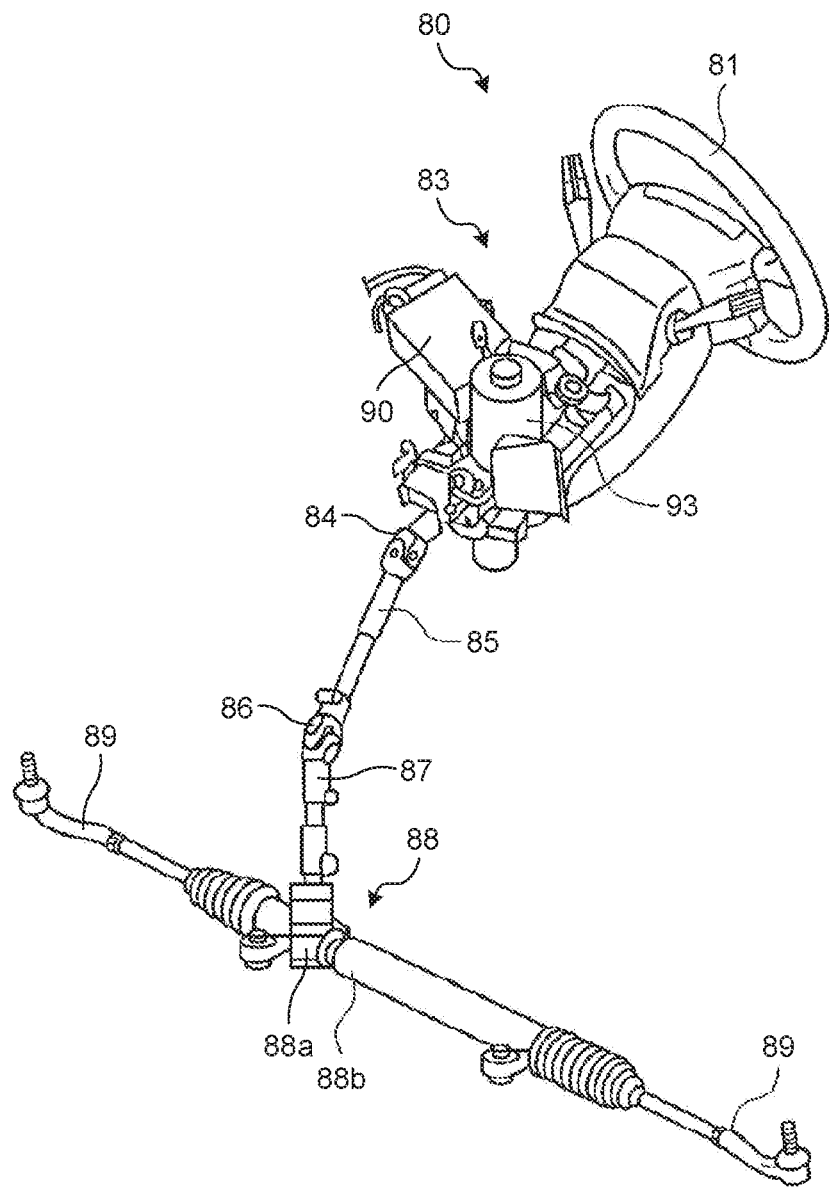
FIG. 2 is a perspective view of the steering system in the present embodiment.

FIG. 1 is a schematic view of a steering system in the present embodiment. FIG. 2 is a perspective view of the steering system in the present embodiment. As illustrated in FIG. 1, a steering system 80 includes a steering wheel 81, a steering shaft 82, a steering-force assist mechanism 83, a universal joint 84, an intermediate shaft 85, and a universal joint 86 in the order in which force input from an operator is transmitted, and is joined to a pinion shaft 87. The following description uses the term "front side" to indicate the front side of a vehicle that has the steering system 80 installed therein, uses the term "rear side" to indicate the rear side of the vehicle, and simply uses the term "vehicle width direction" to indicate the vehicle width direction (a direction parallel to a straight line connecting the right front wheel and the left front wheel) of the vehicle.

As illustrated in FIG. 1, the steering shaft 82 includes an input shaft 82a and an output shaft 82b. One end of the input shaft 82a is coupled to the steering wheel 81, and the other end of the input shaft 82a is coupled to the output shaft 82b. One end of the output shaft 82b is coupled to the input shaft 82a, and the other end of the output shaft 82b is coupled to the universal joint 84.

As illustrated in FIG. 1, the intermediate shaft 85 couples together the universal joint 84 and the universal joint 86. One end of the intermediate shaft 85 is coupled to the universal joint 84, and the other end thereof is coupled to the universal joint 86. One end of the pinion shaft 87 is coupled to the universal joint 86, the other end of the pinion shaft 87 is coupled to a steering gear 88. The rotation of the steering shaft 82 is transmitted to the pinion shaft 87 via the intermediate shaft 85.

As illustrated in FIG. 1, the steering gear 88 includes a pinion 88a and a rack 88b. The pinion 88a is coupled to the pinion shaft 87. The rack 88b engages with the pinion 88a. The steering gear 88 converts rotational motion transmitted to the pinion 88a into linear motion through the rack 88b. The rack 88b is coupled to a tie rod 89. The rack 88b moves to change the angle of a wheel.

As illustrated in FIG. 1, the steering-force assist mechanism 83 includes a speed reducer 92 and an electric motor 93. The speed reducer 92 is, for example, a worm speed reducer. The torque generated by the electric motor 93 is transmitted to a worm wheel through a worm inside the speed reducer 92 and rotates the worm wheel. The speed reducer 92 increases the torque generated by the electric motor 93 using the worm and the worm wheel. The speed reducer 92 then provides auxiliary steering torque to the output shaft 82b. That is, the steering system 80 is column-assist.

As illustrated in FIG. 1, the steering system 80 includes an electronic control unit (ECU) 90, a torque sensor 94, and a vehicle speed sensor 95. The electric motor 93, the torque sensor 94, and the vehicle speed sensor 95 are electrically connected to the ECU 90. The torque sensor 94 outputs steering torque to the ECU 90 by controller area network (CAN) communication after the steering torque is transmitted to the input shaft 82a. The vehicle speed sensor 95 detects the traveling speed (vehicle speed) of a vehicle body that has the steering system 80 installed therein. The vehicle speed sensor 95 is provided in the vehicle body, and outputs the vehicle speed to the ECU 90 by CAN communication.

The ECU 90 controls the electric motor 93. The ECU 90 acquires signals respectively from the torque sensor 94 and the vehicle speed sensor 95. Power is supplied to the ECU 90 from a power supply device 99 (for example, a battery installed on the vehicle) when an ignition switch 98 is on. The ECU 90 calculates an auxiliary steering command value based on the steering torque and the vehicle speed. Based on the auxiliary steering command value, the ECU 90 adjusts the value of power to be supplied the electric motor 93. The ECU 90 acquires information on inductive voltage from the electric motor 93 or information output from a device such as a resolver included in the electric motor 93. The ECU 90 controls the electric motor 93, whereby force needed for operation of the steering wheel 81 is reduced.

Figure 3:
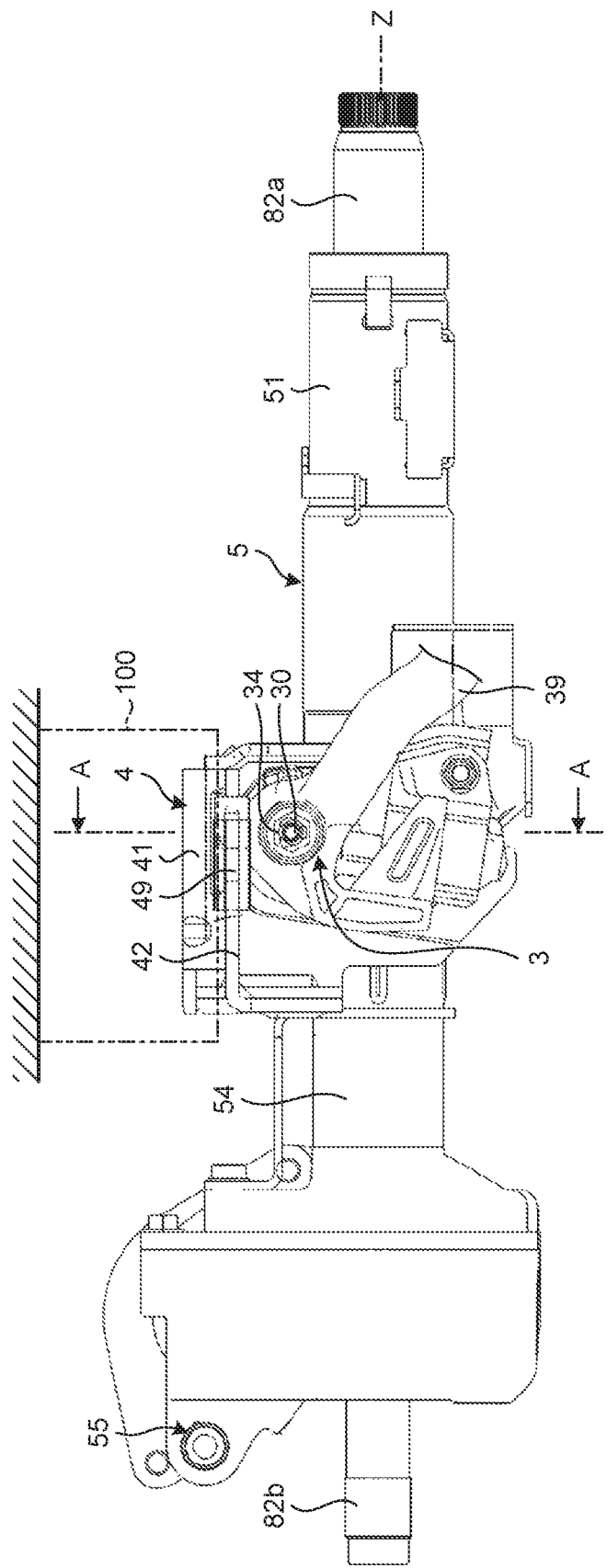
FIG. 3 is a side view of the steering system in the present embodiment.
Figure 4:
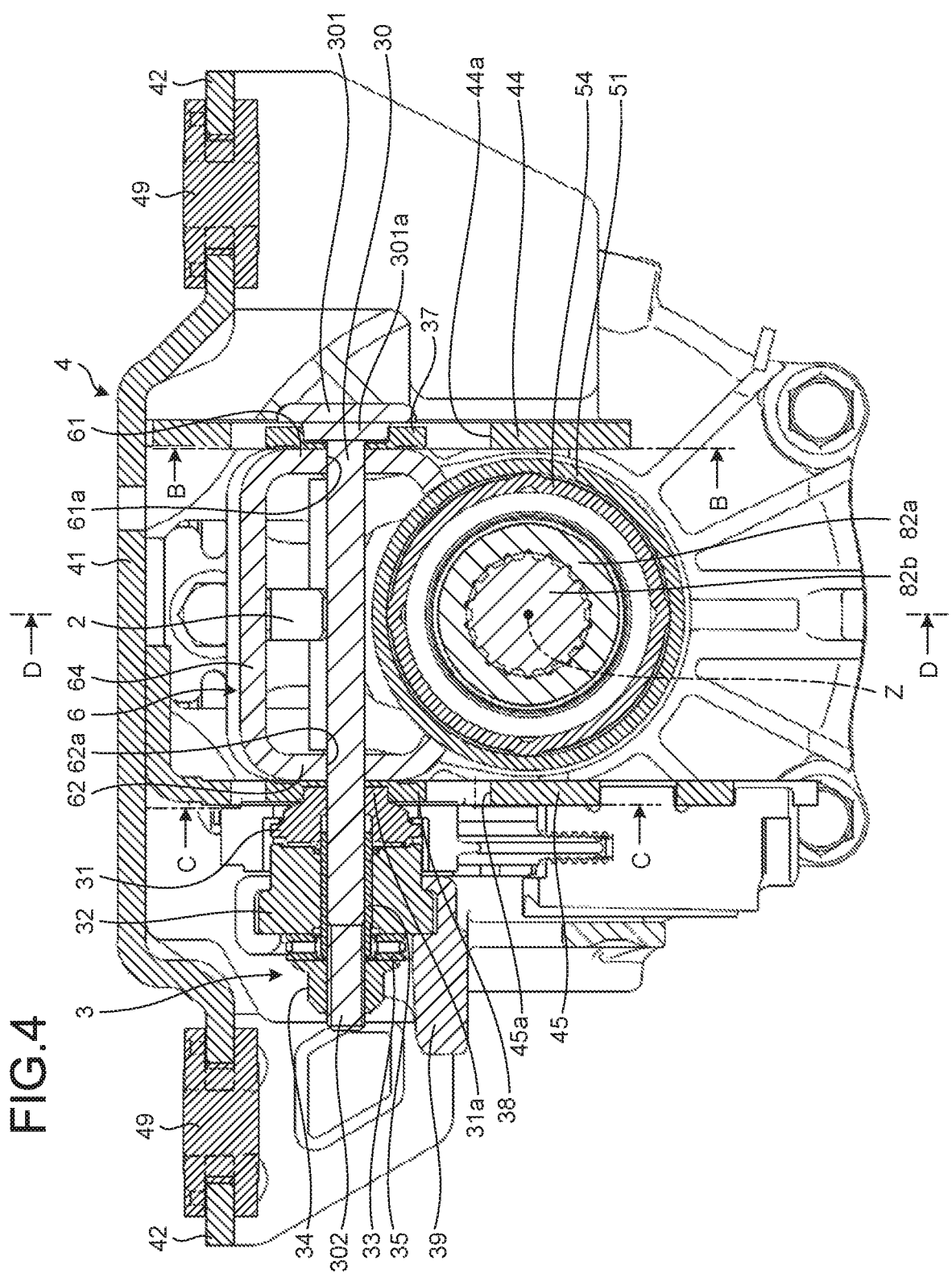
FIG. 4 is a sectional view taken along the line A-A in FIG. 3.
Figure 5:
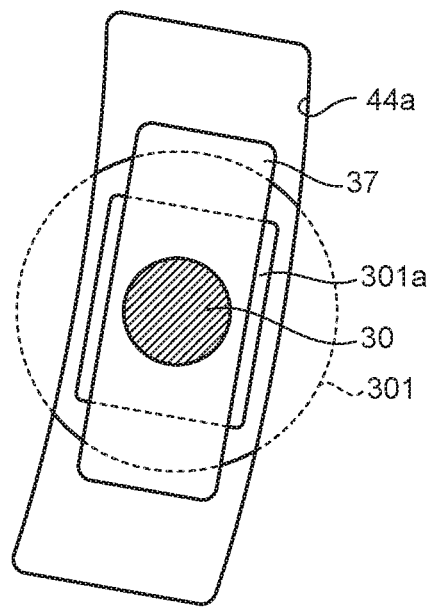
FIG. 5 is a sectional view taken along the line B-B in FIG. 4.
Figure 6:
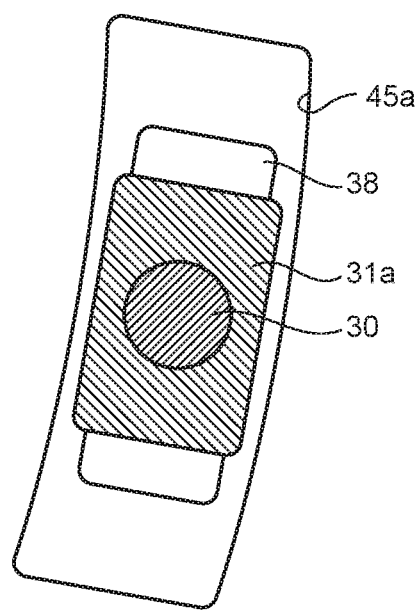
FIG. 6 is a sectional view taken along the line C-C in FIG. 4.
Figure 7:
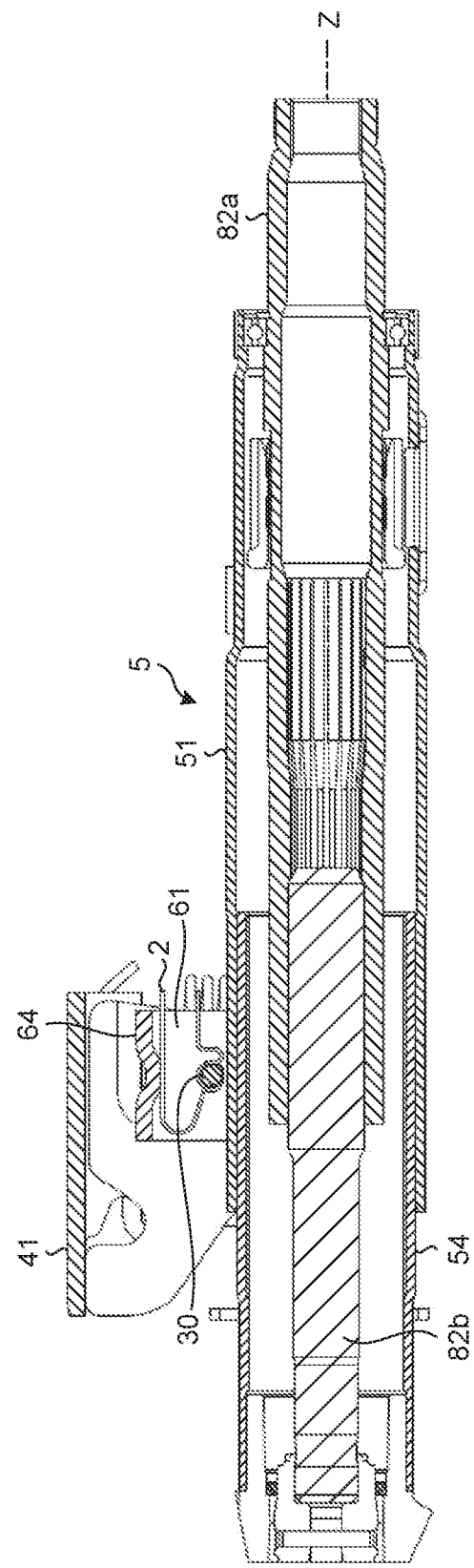
FIG. 7 is a sectional view taken along the line D-D in FIG. 4.
Figure 8:
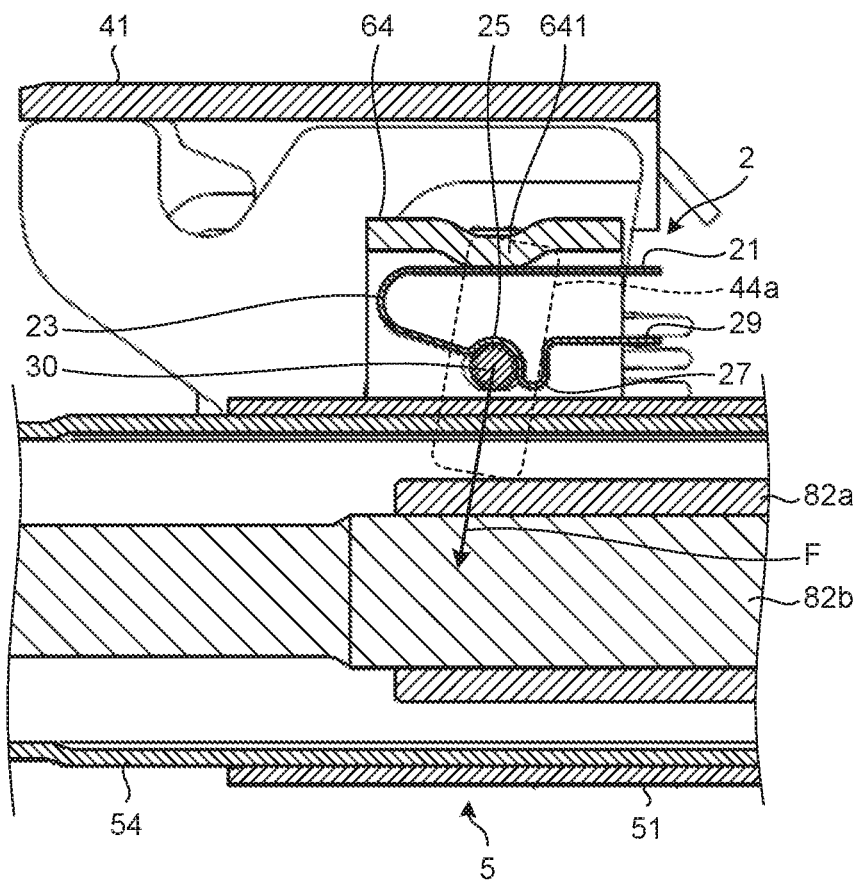
FIG. 8 is an enlarged sectional view illustrating a part surrounding the rod in FIG. 7.
Figure 9:
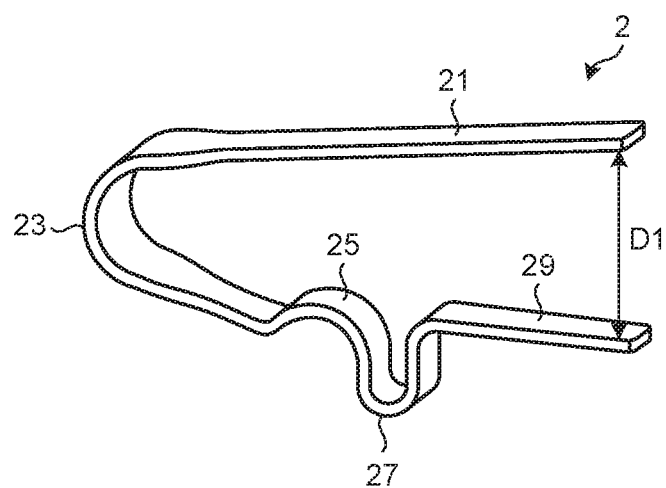
FIG. 9 is a perspective view of an elastic member yet to be attached to the steering system.
Figure 10:
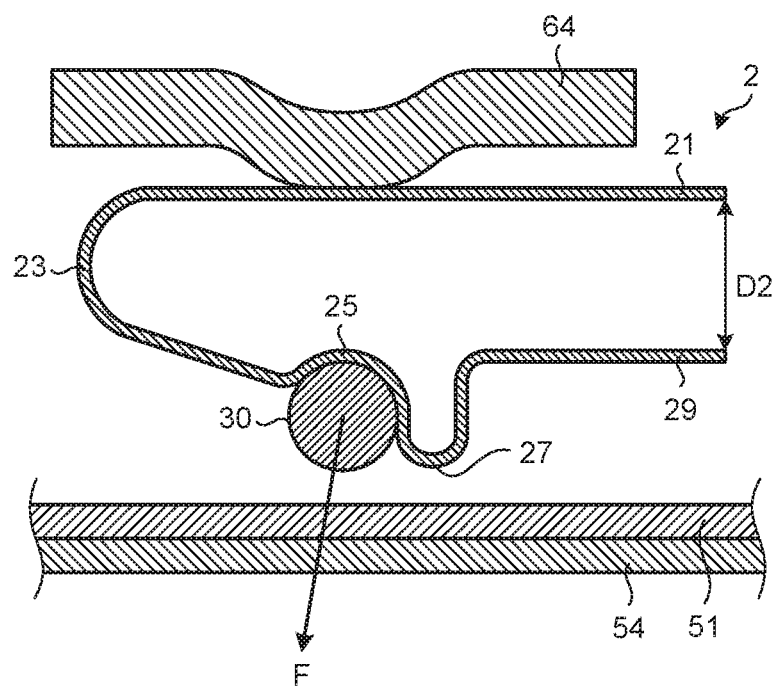
FIG. 10 is a sectional view of the elastic member attached to the steering system.

FIG. 3 is a side view of the steering system in the present embodiment. FIG. 4 is a sectional view taken along the line A-A in FIG. 3. FIG. 5 is a sectional view taken along the line B-B in FIG. 4. FIG. 6 is a sectional view taken along the line C-C in FIG. 4. FIG. 7 is a sectional view taken along the line D-D in FIG. 4. FIG. 8 is an enlarged sectional view illustrating a part surrounding the rod in FIG. 7. FIG. 9 is a perspective view of an elastic member yet to be attached to the steering system. FIG. 10 is a sectional view of the elastic member attached to the steering system.

As illustrated in FIG. 3 and FIG. 4, the steering system 80 includes a steering column 5, a column bracket 4, a distance bracket 6, a tightening mechanism 3, and an elastic member 2.

The steering column 5 is a member supporting the input shaft 82a and the output shaft 82b. The input shaft 82a and the output shaft 82b can rotate about a rotation axis Z. The rotation axis Z is a straight line passing the centroids of sections of the input shaft 82a that are taken along planes perpendicular to a direction in which the input shaft 82a extends. As illustrated in FIG. 3, the steering column 5 is attached to the vehicle body via a pivot bracket 55 and the column bracket 4 that are illustrated in FIG. 3. The pivot bracket 55 supports the steering column 5 in such a manner as to allow the steering column 5 to swing in a vertical direction. The vertical direction means a direction perpendicular both to a direction parallel to the rotation axis Z and to the vehicle width direction.

As illustrated in FIG. 3, the steering column 5 includes an outer column 51 and an inner column 54. The outer column 51 is a substantially cylindrical member. The outer column 51 is disposed in the rear of the inner column 54. The outer column 51 supports the input shaft 82a via a bearing. The inner column 54 is a substantially cylindrical member. A part of inner column 54 is disposed inside the outer column 51. A part of the inner column 54 is placed in contact with an inner wall of the outer column 51, and frictional force is acting between the outer column 51 and the inner column 54. The magnitude of the frictional force that acts between the inner column 54 and the outer column 51 is set so as not to allow the inner column 54 and the outer column 51 to move relatively to each other under the normal condition of use. Meanwhile, the magnitude of the frictional force that acts between the inner column 54 and the outer column 51 is set so as to allow the inner column 54 and the outer column 51 to move relatively to each other when a secondary collision occurs.

The column bracket 4 is a member that supports the steering column 5. As illustrated in FIG. 4, the column bracket 4 includes an upper plate 41, which is disposed above the outer column 51, attachment plates 42, a lateral plate 44, and a lateral plate 45.

As illustrated in FIG. 4, the attachment plates 42 are formed integrally with the upper plate 41 and disposed to opposite sides of the upper plate 41. The attachment plate 42 is coupled via a separation capsule 49 to a vehicle body-side member 100 fixed to the vehicle body. The attachment plate 42 and the separation capsule 49 are coupled together by, for example, a resin member formed by resin injection molding. The separation capsule 49 is formed of, for example, a general lightweight alloy such as an aluminum alloy die casting (ADC) material. The separation capsule 49 is fixed to the vehicle body-side member 100 via, for example, a bolt. When a secondary collision occurs, force acting toward the front side is applied to the steering column 5. The attachment plate 42 consequently moves toward the front side relatively to the separation capsule 49, whereby the resin member is cut off. Thus, support provided by the separation capsule 49 is lost, whereby the outer column 51 and the column bracket 4 separate from the vehicle body. Thereafter, frictional force acting between the outer column 51 and the inner column 54 absorbs impact.

The lateral plate 44 and the lateral plate 45 are fixed to the upper plate 41. The lateral plate 44 and the lateral plate 45 extend downward from the upper plate 41. The lateral plate 44 and the lateral plate 45 are plates perpendicular to the vehicle width direction. The steering column 5 is interposed between the lateral plate 44 and the lateral plate 45. The lateral plate 44 has a long hole 44a therethrough, and the lateral plate 45 has a long hole 45a therethrough. The long hole 44a and the long hole 45a extend in substantially upward and downward directions.

As illustrated in FIG. 4, the distance bracket 6 is fixed to the outer circumferential surface of the outer column 51. The distance bracket 6 is positioned above the outer column 51. The distance bracket 6 includes a vertical plate 61, a vertical plate 62, and a horizontal plate 64.

The vertical plate 61 and the vertical plate 62 are fixed to the outer circumferential surface of the outer column 51. The vertical plate 61 extends upward from the outer column 51 and along the lateral plate 44. The vertical plate 61 has a round hole 61a therethrough. The vertical plate 62 is a plate disposed parallel to the vertical plate 61 and faces the vertical plate 61. The vertical plate 62 has a round hole 62a therethrough. The horizontal plate 64 is a plate coupling together the vertical plate 61 and the vertical plate 62 and faces the outer circumferential surface of the outer column 51. The vertical plate 61, the vertical plate 62, and the horizontal plate 64 are formed integrally with one another. As illustrated in FIG. 4, a section obtained by cutting the distance bracket 6 along a plane perpendicular to the rotation axis Z is substantially U-shaped.

The tightening mechanism 3 is a device for adjusting force that is applied by the column bracket 4 for tightening the distance bracket 6. As illustrated in FIG. 4, the tightening mechanism 3 includes a rod 30, a tilt stopper 37, a stationary cam 31, a tilt stopper 38, a spacer 35, a movable cam 32, a nut 34, a thrust bearing 33, and a lever 39.

The rod 30 has a head part 301 in one end thereof and has a screw part 302 in the other end thereof. The rod 30 penetrates the long hole 44a, the round hole 61a, the round hole 62a, and the long hole 45a. The head part 301 is positioned beside the lateral plate 44, and the screw part 302 is positioned beside the lateral plate 45. The bearing surface of the head part 301 is placed in contact with the lateral plate 44. The head part 301 includes a raised part 301a. As illustrated in FIG. 4 and FIG. 5, the raised part 301a is positioned inside the long hole 44a and faces the inner wall of the long hole 44a. When the rod 30 rotates, the raised part 301a makes contact with the inner wall of the long hole 44a. The raised part 301a restricts the rotation of the rod 30.

The tilt stopper 37 is attached to the rod 30 and is positioned inside the long hole 44a. As illustrated in FIG. 4 and FIG. 5, the tilt stopper 37 sandwiches the raised part 301a from above and from below. The tilt stopper 37 is formed of, for example, synthetic resin.

The stationary cam 31 is a substantially disc-shaped member and includes a raised part 31a. As illustrated in FIG. 4 and FIG. 6, the raised part 31a is positioned inside the long hole 45a and faces the inner wall of the long hole 45a. When the stationary cam 31 rotates, the raised part 31a makes contact with the inner wall of the long hole 45a. The raised part 31a restricts the rotation of the stationary cam 31. The stationary cam 31 is not interlocked with the rotation of the lever 39.

The tilt stopper 38 is attached to the rod 30 and is positioned inside the long hole 45a. As illustrated in FIG. 4 and FIG. 6, the tilt stopper 38 sandwiches the raised part 31a from above and from below. The tilt stopper 38 is formed of, for example, synthetic resin.

The spacer 35 is a substantially cylindrical member attached to the rod 30. The movable cam 32 is a substantially disc-shaped member positioned next to the stationary cam 31. The rod 30 has the movable cam 32 attached thereto via the spacer 35. The spacer 35 suppresses rattling of the movable cam 32 and facilitates alignment of the center of the movable cam 32 with the center of the rod 30. The movable cam 32 is coupled to the lever 39. The movable cam 32 and the lever 39 can rotate relatively to the rod 30.

The nut 34 is fastened to the screw part 302 of the rod 30. The thrust bearing 33 is positioned between the movable cam 32 and the nut 34. The rod 30 has the thrust bearing 33 attached thereto via the spacer 35. The thrust bearing 33 enables the movable cam 32 to rotate relatively to the nut 34.

When the lever 39 rotates, the raised part 31a makes contact with the inner wall of the long hole 45a, whereby the movable cam 32 rotates without the stationary cam 31 rotating. For example, the surface of the stationary cam 31 on one side thereof facing the movable cam 32 has a sloping surface provided in a circumferential direction. Thus, the distance between the movable cam 32 to the stationary cam 31 changes when the movable cam 32 runs on to the sloping surface of the stationary cam 31. The circumferential direction is used to mean directions of tangents of a circle centered at a center line of the rod 30 here and hereinafter. The center line of the rod 30 is a straight line that is parallel to the longitudinal direction of the rod 30 and that passes the centroid of the rod 30.

When the lever 39 is rotated in such a manner that the movable cam 32 moves away from the stationary cam 31, the stationary cam 31 is pressed against the lateral plate 45 at the same time as the head part 301 of the rod 30 is pressed against the lateral plate 44. Thus, frictional force between the head part 301 and the lateral plate 44 and frictional force between the stationary cam 31 and the lateral plate 45 are increased. Consequently, the rod 30 cannot move inside the long hole 44a and the long hole 45a, and the position of the steering column 5 is thus fixed. In contrast, when the lever 39 is rotated in such a manner that the movable cam 32 moves closer to the stationary cam 31, frictional force between the head part 301 and the lateral plate 44 and frictional force between the stationary cam 31 and the lateral plate 45 are reduced or removed. Consequently, the rod 30 can move inside the long hole 44a and the long hole 45a, and adjustment of the position of the steering column 5 is thus enabled. As the position of the steering column 5 changes, the position of the steering wheel 81 changes.

When the steering column 5 makes a certain upward or downward movement from a state in which the rod 30 is positioned at or around the centers of the long hole 44*a* and the long hole 45*a*, the tilt stopper 37 makes contact with an end of the long hole 44*a*, and the tilt stopper 38 makes contact with an end of the long hole 45*a*. Impact is alleviated because the tilt stopper 37 and the tilt stopper 38 are included. The tilt stopper 37 and the tilt stopper 38 also function to smoothen upward and downward movements of the steering column 5.

As illustrated in FIG. 7, the elastic member 2 is positioned between the rod 30 and the horizontal plate 64 of the distance bracket 6. The elastic member 2 is, for example, a plate spring. The elastic member 2 is formed of, for example, a cold-rolled special strip steel for springs such as SK5, S50CM, S55CM, S60CM, or S65CM or is formed of stainless steel strip for springs of a material such as SUS301, SUS304, or SUS631. The elastic member 2 presses the rod 30 toward the steering column 5. For example, the elastic member 2 presses the center of a part of the rod 30 that lies between the vertical plate 61 and the vertical plate 62 in the vehicle width direction. That is, the distance from the elastic member 2 to the vertical plate 61 is equal to the distance from the elastic member 2 to the vertical plate 62.

As illustrated in FIG. 8 to FIG. 10, the elastic member 2 includes a first arm portion 21, a curled portion 23, a recessed portion 25, a protruding portion 27, and a second arm portion 29. The first arm portion 21, the curled portion 23, the recessed portion 25, the protruding portion 27, and the second arm portion 29 are formed integrally with one another.

As illustrated in FIG. 8, the first arm portion 21 is placed in contact with the horizontal plate 64. For example, the first arm portion 21 is placed in contact with a bulged portion 641 provided in the horizontal plate 64. The bulged portion 641 protrudes toward the rod 30. The first arm portion 21 is substantially parallel to the horizontal plate 64. The curled portion 23 continues into the first arm portion 21. The curled portion 23 curves from the front end of the first arm portion 21 toward the rod 30. The recessed portion 25 continues into the curled portion 23. The recessed portion 25 has a shape salient toward the horizontal plate 64. The recessed portion 25 has the rod 30 fitted thereto. The recessed portion 25 curves so as to fit in with the rod 30. The protruding portion 27 continues into the recessed portion 25. The protruding portion 27 has a shape salient toward the steering column 5. The protruding portion 27 is positioned in the rear of the rod 30 and placed in contact with the rod 30. The second arm portion 29 continues into the protruding portion 27. The second arm portion 29 extends toward the rear side from the rear end of the protruding portion 27.

The elastic member 2 is attached to the rod 30, for example, from the rear side of the rod 30. The curled portion 23 is inserted between the rod 30 and the horizontal plate 64 from the rear side with the first arm portion 21 and the second arm portion 29 being gripped. When running into the rod 30, the curled portion 23 is deformed by reaction force from the rod 30. When the elastic member 2 is moved further toward the front side, the rod 30 is fitted to the recessed portion 25 and comes into contact with the protruding portion 27. As a result of having the rod 30 fitted in the recessed portion 25, the elastic member 2 is prevented from falling off the rod 30. As a result of providing the elastic member 2 with the protruding portion 27, positioning when the elastic member 2 is attached to the rod 30 is facilitated.

After the attachment of the elastic member 2 between the rod 30 and the horizontal plate 64, the curled portion 23 is deformed as compared with a state in which no load is applied to the elastic member 2 (a state illustrated in FIG. 9). As illustrated in FIG. 9, the distance between the rear end of the first arm portion 21 and the rear end of the second arm portion 29 before the attachment of the elastic member 2 to the rod 30 is denoted as a distance D1. As illustrated in FIG. 10, the distance between the rear end of the first arm portion 21 and the rear end of the second arm portion 29 after the attachment of the elastic member 2 to the rod 30 is denoted as a distance D2. The distance D2 is smaller than the distance D1. Elastic force is generated in the curled portion 23. Consequently, the recessed portion 25 presses the rod 30. As illustrated in FIG. 10, force F is applied to the rod 30. The force F is the resultant of force acting downward and force acting toward the front side. The direction in which the force F acts forms an angle with the upward and downward directions.

When the column bracket that has been tightened by the tightening mechanism 3 is loosened, a load that has been applied to the rod 30 is reduced or removed. If the elastic member 2 is not included, gaps are formed between the rod 30 and the long hole 44*a*, between the rod 30 and the long hole 45*a*, between the rod 30 and the round hole 61*a*, and between the rod 30 and the round hole 62*a*. Meanwhile, the weight of the lever 39 causes downward force to act on a part of the rod 30 that faces the lever 39. Under these conditions, either upward or downward movement of the steering column 5 causes rattling of the rod 30. Consequently, vibration may be caused by friction between the head part 301 of the rod 30 and the lateral plate 44. This phenomenon is called stick slip.

Given this inconvenience, the elastic member 2 presses the rod 30 toward the steering column 5 in the present embodiment. Thus, the rod 30 is pressed against the inner walls of the round hole 61*a* and the round hole 62*a*, which are illustrated in FIG. 4. Consequently, no gap is left between the rod 30 and the inner wall of the round hole 61*a* and between the rod 30 and the inner wall of the round hole 62*a*. Consequently, rattling that occurs when the steering column 5 makes an upward or downward movement is therefore suppressed. That is, stick slip is suppressed. As s result, the steering column 5 makes smoother movements.

When the rod 30 is pressed against the inner walls of the round hole 61*a* and the round hole 62*a*, friction acts between the rod 30 and the inner wall of the round hole 61*a* and between the rod 30 and the inner wall of the round hole 62*a*. The friction acting on the rod 30 makes the rod 30 difficult to rotate. As a result, vibration attributable to rotation of the rod 30 is suppressed.

In the steering column 5, the outer column 51 does not need to be positioned nearer to the rear side than the inner column 54. The outer column 51 may be positioned nearer to the front side than the inner column 54. Even in that case, frictional force acting between the outer column 51 and the inner column 54 absorbs impact when a secondary collision occurs.

The elastic member 2 does not necessarily need to be a plate spring. The elastic member 2 needs at least to be a member placed in contact with the rod 30 and the horizontal plate 64 and pressing the rod 30 toward the steering column 5. For example, the elastic member 2 is a coil spring.

In the elastic member 2, the positions of the curled portion 23 and the protruding portion 27 relative to the rod 30 are not limited to the positions described above. For example, the curled portion 23 may be positioned nearer to the rear side than the rod 30, and the protruding portion 27 may be positioned nearer to the front side than the rod 30. In such a case, the elastic member 2 is inserted between the rod 30 and the horizontal plate 64 from the front side of the rod 30.

The direction in which the force F applied by the elastic member 2 that acts on the rod 30 does not necessarily need to be the direction illustrated in FIG. 10. The force F needs at least to include force that acts toward the steering column 5 from the horizontal plate 64. For example, the angle formed between the direction of the force F and the upward-downward direction may be 0° or may be larger than the angle illustrated in FIG. 10.

The distance bracket 6 may be disposed on the lower side of the steering column 5. In such a case, the elastic member 2 presses the rod 30 upward.

As described above, the steering system 80 includes the steering column 5, the column bracket 4, the distance bracket 6, the rod 30, and the elastic member 2. The steering column 5 supports the input shaft 82a coupled to the steering wheel 81. The column bracket 4 has the long hole 44a and the long hole 45a therethrough and supports the steering column 5. The distance bracket 6 includes: two vertical plates (the vertical plate 61 and the vertical plate 62) provided on the outer circumferential surface of the steering column 5 and extending along the column bracket 4; and the horizontal plate 64 coupling together the two vertical plates (the vertical plate 61 and the vertical plate 62). The rod 30 penetrates the long hole 44a, the long hole 45a, the vertical plate 61, and the vertical plate 62. The elastic member 2 is positioned between the horizontal plate 64 and the rod 30 and presses the rod 30 toward the steering column 5.

Thus, the rod 30 is pressed against the inner wall of the round hole 61a provided through the vertical plate 61 and the inner wall of the round hole 62a provided through the vertical plate 62. Consequently, rattling that occurs when the steering column 5 moves is suppressed. Furthermore, the elastic member 2 can be attached to the rod 30 even without a slit provided in the steering column 5. The steering system 80 is therefore capable of suppressing rattling that occurs when the position of the steering wheel 81 is adjusted and also capable of facilitating attachment of a member for suppressing such rattling.

In the steering system 80, the elastic member 2 includes the recessed portion 25 salient toward the horizontal plate 64. The rod 30 is fitted in the recessed portion 25. Thus, the elastic member 2 is prevented from falling off the rod 30.

In the steering system 80, the elastic member 2 includes the protruding portion 27 positioned nearer to the front side or the rear side than the rod 30. The rod 30 is placed in contact with the protruding portion 27. Thus, positioning when the elastic member 2 is attached to the rod 30 is facilitated.

In the steering system 80, the elastic member 2 is a plate spring. Thus, manufacturing of the elastic member 2 is facilitated.

In the steering system 80, the distance from the elastic member 2 to one of the vertical plates (the vertical plate 61) is equal to the distance from the elastic member 2 to the other vertical plate (the vertical plate 62). Thus, both of the vertical plates (the vertical plate 61 and the vertical plate 62) are less likely have gaps with the rod 30. Consequently, suppression of rattling that occurs when the position of the steering wheel 81 is adjusted is further facilitated.

REFERENCE SIGNS LIST

100 VEHICLE BODY-SIDE MEMBER
2 ELASTIC MEMBER
21 FIRST ARM PORTION
23 CURLED PORTION
25 RECESSED PORTION
27 PROTRUDING PORTION
29 SECOND ARM PORTION
3 TIGHTENING MECHANISM
30 ROD
301 HEAD PART
301a RAISED PART
302 SCREW PART
31 STATIONARY CAM
31a RAISED PART
32 MOVABLE CAM
33 THRUST BEARING
34 NUT
35 SPACER
37, 38 TILT STOPPER
39 LEVER
4 COLUMN BRACKET
41 UPPER PLATE
42 ATTACHMENT PLATE
44, 45 LATERAL PLATE
44a, 45a LONG HOLE
49 SEPARATION CAPSULE
5 STEERING COLUMN
51 OUTER COLUMN
54 INNER COLUMN
55 PIVOT BRACKET
6 DISTANCE BRACKET
61, 62 VERTICAL PLATE
61a, 62a ROUND HOLE
64 HORIZONTAL PLATE
80 STEERING SYSTEM
81 STEERING WHEEL
82 STEERING SHAFT
82a INPUT SHAFT
82b OUTPUT SHAFT
83 STEERING-FORCE ASSIST MECHANISM
84 UNIVERSAL JOINT
85 INTERMEDIATE SHAFT
86 UNIVERSAL JOINT
87 PINION SHAFT
88 STEERING GEAR
88a PINION
88b RACK
89 TIE ROD
90 ECU
92 SPEED REDUCER
93 ELECTRIC MOTOR
94 TORQUE SENSOR
95 VEHICLE SPEED SENSOR
98 IGNITION SWITCH
99 POWER SUPPLY DEVICE
F FORCE
Z ROTATION AXIS

The invention claimed is:

1. A steering system comprising:
a steering column supporting an input shaft coupled to a steering wheel;
a column bracket having a long hole therethrough and supporting the steering column;
a distance bracket including two vertical plates and a horizontal plate, the two vertical plates being provided on an outer circumferential surface of the steering column and extending along the column bracket, the horizontal plate coupling together the two vertical plates;

a rod penetrating the long hole and the vertical plates; and an elastic member positioned between the horizontal plate and the rod, placed in contact with the horizontal plate and pressing the rod toward the steering column.

2. The steering system according to claim 1, wherein the elastic member includes a recessed portion salient toward the horizontal plate, and the rod is fitted in the recessed portion.

3. The steering system according to claim 1, wherein the elastic member includes a protruding portion positioned nearer to a front side of a vehicle or a rear side of a vehicle than the rod, and the rod is placed in contact with the protruding portion.

4. The steering system according to claim 1, wherein the elastic member is a plate spring.

5. The steering system according to claim 1, wherein a distance from the elastic member to one of the vertical plates is equal to a distance from the elastic member to the other vertical plate.

* * * * *